July 8, 1969 E. J. MEAD ET AL 3,454,422
ORGANOPOLYSILOXANE COATED FILLING MATERIALS
AND THE PRODUCTION THEREOF
Filed March 13, 1964
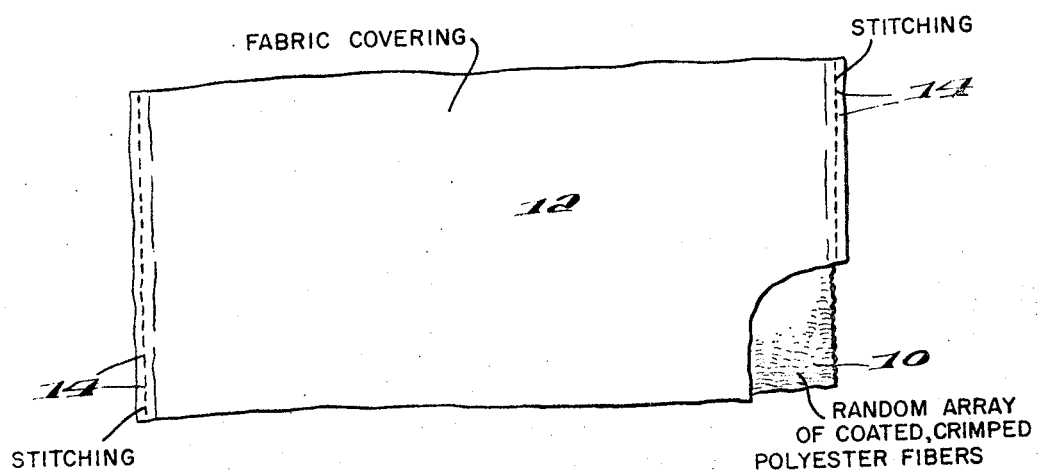
INVENTORS
EDWARD JAIRUS MEAD,
VERNAL HARDY SCHEUERMAN,
BY Gordon R. Coons
AGENT

United States Patent Office 3,454,422
Patented July 8, 1969

3,454,422
ORGANOPOLYSILOXANE COATED FILLING MATERIALS AND THE PRODUCTION THEREOF
Edward Jairus Mead and Vernal Hardy Scheuerman, Wilmington, Del., assignors to E. I. du Pont de Nemours and Company, Wilmington, Del., a corporation of Delaware
Filed Mar. 13, 1964, Ser. No. 351,795
Int. Cl. C08d 13/24; C08c 17/16; C09d 3/48
U.S. Cl. 117—138.8
9 Claims

ABSTRACT OF THE DISCLOSURE

A filling material of improved bulk stability comprising polyester crimped fibers in random arrangement having specified crimp index, crimp frequncy, and fiber length, the polyester crimped fibers containing as a coating thereon, from about 0.30 to about 3.0% by weight based on the weight of the fibers, of a member selected from the group consisting of (a) methylhydrogenpolysiloxane, (b) dimethyl/methylhydrogen copolysiloxane, (c) mixtures containing an organopolysiloxane of specified properties and at least one organopolysiloxane selected from (a) (b), and (d) mixtures containing block copolymers of dimethylpolysiloxane and polyethylene oxide. A process is provided which applies such a coating to the filling material.

---

This invention relates to filling materials and more particularly to filling material comprising synthetic, linear polyester fibers.

The characteristics most desired in filling materials for pillows, quilts, sleeping bags, insulated garments and the like, are high bulk, bulk stability, and resilience. A high degree of bulk stability is needed so that the article will readily retain its original shape and thus provide maximum cushioning and insulating properties. The ability of a filling material to withstand thorough cleaning and sterilizing procedures without loss of mechanical or aesthetic properties is also highly advantageous. These characteristics must be maintained through many cycles of compression and "fluffing" over long periods of service and through cleaning.

Fibers which combine a relatively high resistance to bending, stretching and tension with the ability to substantially recover from distortion and which are relatively unaffected by moisture are most suitable. In this regard, polyester fibers are outstanding, having excellent resilience which is not affected by moisture.

The polyester fibers are generally prepared in staple lengths and processed into the form of a low-density batt by using well-known carding or garnetting equipment to produce a web, and cross-lapping the web on an apron to build up the desired thickness. Although superior to most other materials, such batts gradually compress or mat on repeated use.

Another well-known type of preparation is to produce random arrangements. Such methods of producing randomized structures are described in U.S. Patent 2,477,675, to Wilson et al., issued on Aug. 2, 1949; U.S. Patent 2,577,784, to Lynam, issued on Dec. 11, 1951; U.S. Patent 2,731,679, to Kennette et al. issued on Jan. 24, 1956; and U.S. Patent 2,841,204, to Goldman, issued on July 1, 1958. However, such structures are limited by a deficiency in bulk stability; and treatment with bonding agents in order to stabilize their bulk invariably results in the loss of aesthetic properties.

An object of this invention is to provide a filling material with improved bulk stability. A further object is to provide a filling material comprising synthetic, linear, polyester fibers, which has improved bulk stability. Other objects will appear hereinafter.

The objects of this invention are accomplished by an improved filling material comprising polyester staple fibers arranged in random array, said fibers containing as a coating thereon, from about 0.30 to about 3.0% by weight, based on the weight of the fibers, of an organopolysiloxane selected from the group consisting of (a) a methylhydrogenpolysiloxane containing between 1.0 and 1.5 methyl radicals and between 0.75 and 1.0 hydrogen atoms bonded to silcon, per atom of silicon, there being a total of 2.0 to 2.25 methyl radicals and hydrogen atoms per silicon atom, (b) a dimethyl/methylhydrogen copolysiloxane in which at least 2% of the silicon atoms are bonded to hydrogen there being a total of 2.0 to 2.25 methyl radicals and hydrogen atoms per silicon atom, (c) a mixture containing an organopolysiloxane having a viscosity, at 25° C., between 1,000 and 10,000 centistokes and containing between 2.0 and 2.1 radicals per silicon atom, said radicals consisting of hydrocarbon radicals free from aliphatic unsaturation and having from 1 to 6 carbon atoms, and at least one organopolysiloxane selected from (a) and (b), said mixture being such that at least 2% of the total silicon atoms are bonded to hydrogen and (d) a mixture containing a block copolymer of dimethylpolysiloxane and polyethylene oxide, said block copolymer containing between 15 and 85% by weight of dimethylpolysiloxane and having a viscosity at 25° C., between 10 and 3,000 centistokes, and an organo polysiloxane selected from (a) and (b), said mixture being such that at least 2% of the total silicon atoms are bonded to hydrogen.

With reference to the accompanying drawing, there is shown a plan view of a cushioning article utilizing the filling material of this invention, partially in cross-section composed of a random array of coated, crimped polyester fibers 10 and a fabric covering 12 held in place by stitching 14 through the covering and fibers at the edges of the cushioning article.

Also, it is necessary for the practice of this invention to use crimped fibers; and it is further desirable to maintain the kind and degree of crimp within defined ranges. In describing these preferred ranges, the symbol "$L_1$" represents the extended length of the fiber under tension just sufficient to remove the crimp, while the symbol "$L_2$" represents the length of the fiber under no tension and in the crimped condition. The symbol "I" represents the crimp index which is expressed in percentage and is defined by the equation:

$$I = \frac{100(L_1 - L_2)}{L_1}$$

Fibers suitable for this invention must have a crimp index of at least 6 and preferably above 12. When the crimp index is below 6, the finished article becomes matted and firm through continued use and does not show the advantages of this invention. It is also important for purposes of this invention to maintain the number of crimps per inch of length $L_1$ at not less than 4 and preferably above 7. Less than 4 crimps per inch, even at a high crimp index, will not result in a resilient and high-bulk material. The length of the fibers used is of significant improtance in determining the properties of the finished article. The utilization of fibers having a length $L_1$ of less than 1 inch results in a loss of bulk and resiliency whereas increasing the length beyond 4 inches causes no significant improvement in the properties of the finished article and lengths beyond 8 inches become difficult to process. Therefore, it is preferred to maintain the fiber lengths between about 2 inches and about 4 inches.

The random arrangement of fibers for the practice of this invention can be prepared in any suitable manner. By "random arrangement" or "random array" is meant lack of orientation, the fibers being arranged in jackstraw fashion with respect to each other with no tendency to layering, and the mass being uniform in strength and density in all directions. It is preferred that the density be between 0.5 and 1.5 lb./ft.³. Accordingly, a desirable method of producing low-density fiber mass in which the fibers are in random array, is the use of commercially available equipment designed to open, i.e., reduce the density of relatively compact fibrous masses such as baled staple fibers.

As was hereintofore mentioned, the organopolysiloxane coatings which are necessary to achieve the improved filling material of this invention are of four main categories. In category (a), the polysiloxane is a methylhydrogensiloxane, i.e., a polysiloxanze in which one hydrogen atom and one methyl radical are bonded to each silicon atom with the exception of the end groups which may be end-blocked preferably with trimethylsiloxy groups. Such methylhydrogenpolysiloxane fluids are commercially available materials and methods for preparing them have been described in U.S. Patent 2,588,365, to Dennett, issued on Mar. 11, 1952. For the purpose of this invention, methylhydrogenpolysiloxane is a fluid which contains between 1.0 and 1.5 methyl radicals and between 0.75 and 1.0 hydrogen atoms bonded to silicon, per silicon atom in the compound, and the sum of the methyl radicals and the hydrogen atoms ranges from 2.0 to 2.25 per silicon atom.

Modified methylhydrogenpolysiloxanes, category (b) are also suitable. Such compounds are prepared by cohydrolyzing and condensing methylhydrogendichlorosilane and other dichlorosilanes such as methylphenyldichlorosilane, methylamyldichlorosilane and dimethyldichlorosilane. The dimethylmethylhydrogen copolysiloxane fluids are preferred, and, for the practice of this invention, at least 2% of the silicon atoms are bonded to hydrogen. Preferably, the copolysiloxanes have at least 40% of the silicon atoms bonded to hydrogen and, as such, contain between 1.0 and 1.95 methyl radicals and between 0.3 and 1.0 hydrogen atoms bonded to silicon, per silicon atom in the compounded, and the sum of the methyl radicals and the hydrogen atom ranges from 2.0 to 2.25 per silicon atom. These modified polysiloxanes may be end-blocked, preferably with trimethylsiloxy groups. In addition, the modified methylhydrogenpolysiloxane may be a block copolymer of a polysiloxane containing silicon-hydrogen bonds and a polyalkylene oxide, preferably polyethylene oxide. In such block copolymers, it is necessary that at least 0.05% by weight of the compound be due to silicon bonded to hydrogen in order to provide adequate curing. Preferably the block copolymers contain no Si—O—C bonds.

In category (c), mixtures of polysiloxanes containing silicon-hydrogen bonds and an organopolysiloxane fluid containing approximately two hydrocarbon radicals per silicon atom may be used provided that at least 2% of the total number of silicon atoms in the mixture are bonded to hydrogen. Preferably, the organoposiloxane is a dimethylpolysiloxane containing between 2.0 and 2.1 methyl radicals and having a viscosity, at 25° C., between 1,000 and 100,000 centistokes.

In category (d), the polysiloxane containing silicon-hydrogen bonds may also be applied in admixture with block copolymers of dimethylpolysiloxane and a polyalkylene oxide, preferably polyethylene oxide. The copolymer contains between 15 and 85% by weight of dimethylpolysiloxane and has a viscosity, at 25° C., varying from 10 to 3,000 centistokes. Preferably, the block copolymers contain no Si—O—C bonds.

It should be noted that polysiloxanes which do not contain silicon-hydrogen bonds are not suitable for use in this invention. For example, the use of dimethylpolysiloxane, methylphenylpolysiloxane or a dimethylpolysiloxane having about 8% amyl groups does not lead to any improvement in bulk stability over that of untreated controls. However, as was discussed above, these non-curable polysiloxanes can be used in admixture with polysiloxanes containing silicon-hydrogen bonds provided that at least 2% of the total number of silicon atoms in the mixture are bonded to hydrogen.

The polysiloxane may be applied directly or diluted with a suitable solvent; however, it is preferred to apply the polysiloxane in the form of an aqueous emulsion. A catalyst is preferably used to accelerate the curing of the polysiloxanes containing Si—H bonds and, for convenience, may be added to the emulsion and the combination used to treat the fiber. Suitable catalysts are iron, cobalt, manganese, lead, zinc, and tin salts of carboxylic acids such as acetates, octanoates, naphthenates and oleates. This polysiloxane emulsion may be applied to the fibers in any appropriate manner, either before or after opening. Thus, the fibers may be dipped, sprayed, or padded and the fiber dried to remove water; a conventional pad bath is usually preferred. The fibers are then heated to between 65° and 200° C., preferably between 85° and 95° C. for from 1 to 120 minutes. This heating effects liberation of a major portion of the hydrogen which is bonded to the silicon in the methylhydrogenpolysiloxane. The decomposition product is polymerized to an insoluble polymer, thus, rendering the treatment permanent.

The bulk stability of a filling material can be determined by laboratory tests which repeatedly compress and release the filling material or by actual use. Laboratory bulk determinations are carried out by using a ticking measuring 20 x 26 inches and filling it with 20 ounces of stuffing material to form a pillow. The height of the filled pillow, at its center, is then determined.

After the initial height (IH) has been determined, the filled structure is submitted to a repeated cycle of compression and load release. Repeat loadings can conveniently be carried out by placing the filled structure on a turntable associated with two pairs of 4 x 12-inch air powered worker feet which are mounted above the turntable in such a fashion that during one revolution essentially the entire contents are subjected to compression and released. Compression is accomplished by powering the worker feet with 80 pounds air pressure such that they exert a static load of approximately 115 pounds when in contact with the turntable. The turntable rotates at a speed of 1 revolution per minute and each of the worker feet compresses and releases the filling material 10 times per revolution. After being repeatedly compressed for a specified period of time, the pillow is refluffed. Refluffing may be carried out by hand or by tumbling for 5 minutes in suitable equipment such as a tumble dryer. Comparative testing of hand-fluffing versus tumbling in drying equipment shows hand-fluffing gives approximately 2 to 5% greater bulk values. In using the tumble dryer, no heat is applied to the pillow, i.e., the machine is used only to provide the mechanical manipulation provided by the cascade action. The height of the refluffed pillow is determined and the value recorded as the worked height (WH). The percent bulk loss is then calculated from the equation $$\% \text{ Bulk Loss} = 100 \frac{(IH - WH)}{IH}$$

The following examples are illustrative of the invention but not in limitation thereof. All parts and percentages are by weight unless otherwise indicated. As is shown in Table III of Example III, the percentage of silicon atoms having Si—H bonds in the coating, has been found to be substantially equivalent to the weight percent of the polysiloxane having Si—H bonds.

EXAMPLE I

Polyethylene terephthalate fibers having a denier of 4.8 and a length of 2 inches are stuffer-box crimped so as to have 8.3 crimps per inch and a crimp index of 23.2. The crimped fibers are processed through a "Fiber Blending Opener" machine manufactured by the Davis and Furber Machine Company, North Andover, Mass. to give a mass of fibers in random array. Twenty ounces of these fibers are placed in a 20-inch x 26-inch pillow tick and labeled "Pillow A." A second portion of the above-randomized fibers is dipped into a 1% aqueous emulsion of a polysiloxane mixture consisting of 60% dimethylpolysiloxane and 40% of methylhydrogenpolysiloxane, the mixture having a viscosity of approximately 110 centipoises at 25° C. with approximately 40% of the silicon atoms being bonded to hydrogen. The emulsion contains 0.05% of a tin diacetate, zinc octanoate curing catalyst for the polysiloxane. The wet fibers are centrifuged and then tumble-dried for 15 minutes at about 90° C. The fibers are found to gain about 2% in weight based on the weight of the fibers. Twenty ounces of the polysiloxane-treated fibers are placed in a 20- x 26-inch tick and labeled "Pillow B."

A portion of the crimped fibers is opened and formed into a web using a garnet and the web cross-lapped into a batt. Twenty ounces of this batt are placed in a 20- x 26-inch pillow tick and labeled "Pillow C." Another portion of the crimped fibers is treated with the above 1% emulsion as described for Pillow B and processed through the garnet and cross-lapped into a batt. Twenty ounces of this batt, which contains 2% by weight of the polysiloxane, based on the weight of the fibers, are placed in a 20- x 26-inch tick and labeled "Pillow D." The initial height of each of the pillows A to D is measured and the pillows then subjected to the previously described durability test for two hours. The pillows then are refluffed for 5 minutes in a commercial "Cascade" dryer. The worked heights are measured and the bulk loss calculated. The results are given in Table I. From these results, it is evident that the bulk durability of conventional batt pillows is not improved by the use of the polysiloxane, and that randomized fibers treated with the polysiloxane are markedly superior in bulk durability to untreated fibers and batts in that the bulk loss is only about half that of the other materials.

TABLE I

| Pillow height data | Pillows | | | |
|---|---|---|---|---|
| | A | B | C | D |
| Initial height, inches | 8.0 | 8.0 | 8.9 | 8.7 |
| Worked height, inches | 6.2 | 7.0 | 6.6 | 6.4 |
| Bulk loss, percent | 23 | 13 | 26 | 26 |

EXAMPLE II

Polyethylene terephthalate fibers having a denier of 3.9, a length of 1.9 inch, a helicalcrimp of 9.5 crimps per inch, and a crimp index of 26 are treated as described below:

One portion of the fibers, Sample E, is placed in a bath of a 3% aqueous emulsion of the polysiloxane of Example I. The emulsion contains 0.15% of tin diacetate, zinc octanoate as catalyst. After 30 minutes, the fibers are removed from the bath, centrifuged and tumble-dried at 90° C. for 10 minutes. The fibers are found to gain about 2% by weight, based on the weight of the fiber. A second portion of the fibers, Sample F, is placed in a fiber blender equipped with a spray nozzle. A mineral oil, having a viscosity of about 130 centipoises at 25° C., is sprayed onto the fibers until they gain about 2% in weight, based on the weight of the fibers. A third portion of the fibers, Sample G, remains untreated. Samples E, F and G are each separately garnetted into a web and the web passed through the Kirschner beater section of a cotton picker to randomize the fibers. The loose, opened, randomized fibers are then placed in ticks measuring 20 x 26 inches, each tick being filled with 20 ounces of fiber. Six pillows are made from each of Samples E, F and G and the average height determined. The pillows are then wear-tested by putting them into use for a period of 9 ounces. After the test period, the pillows are tumbled for 5 minutes in a commercial "Cascade" dryer, the height measured and the loss in bulk calculated. The results are given in Table II.

TABLE II

| Pillow height data | Sample E, fiber with 2% polysiloxane | Sample F, fiber with 2% mineral oil | Sample G, untreated fiber |
|---|---|---|---|
| Initial height, inches | 8.0 | 7.9 | 8.1 |
| After 270 days | 6.0 | 5.1 | 5.1 |
| Bulk loss | 25% | 35% | 37% |

The results of this use test show that the fibers treated with the polysiloxane have a significantly lower bulk loss than do untreated fibers and fibers treated with a common lubricating agent.

EXAMPLE III

Polyethylene terephthalate fibers, of the kind described in Example I, are treated with 1% aqueous emulsions of polysiloxanes containing 0.05% of the curing catalyst of Example I. Six portions, Samples H to M, are treated separately with emulsions of the polysiloxanes described below:

Sample H is treated with an emulsion of methylhydrogenpolysiloxane having a viscosity of 30 centipoises at 25° C.

Sample I is treated with an emulsion of a 50/50 dimethyl/methylhydrogenpolysiloxane copolymer having a viscosity of approximately 60 centipoises at 25° C.

Sample J is treated wtih an emulsion of a mixture of polysiloxanes consisting of 80 parts of dimethylpolysiloxane and 20 parts of methylhydrogenpolysiloxane, the mixture having a viscosity of approximately 205 centipoises at 25° C.

Sample K is treated with an emulsion of a mixture of polysiloxanes consisting of 90 parts of dimethylpolysiloxane and 10 parts of methylhydrogenpolysiloxane, the mixture having a viscosity of approximately 360 centipoises at 25° C.

Sample L is treated with an emulsion of a mixture consisting of 98 parts of dimethylpolysiloxane and 2 parts of methylhydrogenpolysiloxane, the mixture having a viscosity of approximately 910 centipoises at 25° C.

Sample M is treated with an emulsion of dimethylpolysiloxane having a viscosity of 1500 centipoises at 25° C.

The wet fibers are centrifuged and then tumble-dried at 90° C. for 15 minutes. The fibers of each of the samples H to M gain about 1% in weight, based on the weight of the fibers.

A seventh portion, Sample N, remains untreated.

Each of the fiber samples H to N are then separately garnetted into a web and the webs passed through the Kirschner beater section of a cotton picker to randomize the fibers. Twenty ounces of each sample of randomized fibers is then placed in ticks measuring 20 x 26 inches. The initial heights of the pillows are measured and the pillows subjected to the laboratory durability test for a period of one hour. The pillows are hand-fluffed, the worked heights determined, and the bulk loss calculated. The results are given in Table III:

TABLE III

| | Sample | | | | | | |
|---|---|---|---|---|---|---|---|
| | H | I | J | K | L | M | N |
| | Percentage of silicon atoms having Si-H bonds (approx.) | | | | | | |
| | 100 | 50 | 20 | 10 | 2 | 0 | |
| Pillow Height Data: | | | | | | | |
| Initial height, inches | 8.4 | 8.4 | 8.4 | 8.5 | 8.6 | 8.6 | 8.7 |
| Worked height, inches | 7.5 | 7.6 | 7.5 | 7.6 | 7.6 | 7.1 | 7.3 |
| Bulk loss | 11% | 10% | 11% | 11% | 12% | 17% | 16% |

This example shows the polysiloxane used to treat the fibers must contain some silicon-hydrogen bonds if an improvement in bulk loss is to be realized.

EXAMPLE IV

Polyester fibers of polyethylene terephthalate isophthalate (88/12) having a denier of 6.0, a length of 1.5 inch and 10.4 crimps per inch are treated with the polysiloxane emulsion and catalyst used in Example I. The treated fibers are centrifuged and tumble-dried at 90° C. for 15 minutes. The fibers gain 1% in weight, based on the weight of the fibers. The fibers are then processed through a wool blender to randomize the fibers. Twenty ounces of the randomized fibers are placed in a tick measuring 20 x 26 inches and the initial height measured. Twenty ounces of untreated, randomized fibers of the above-described polyester are also placed in a tick measuring 20 x 26 inches and the height determined. The pillows are then subjected to the laboratory durability test for one hour, refluffed by hand and the worked heights determined. The pillow containing the fibers treated with the polysiloxane has a bulk loss of 20% while the untreated pillow has a bulk loss of 37%.

EXAMPLE V

Poly(p-hexahydroxylene terephthalate) having a denier of 5.8, a length of 2 inches and 7.9 crimps per inch are treated with the polysiloxane emulsion and catalyst used in Example I. The treated fibers are centrifuged and tumble-dried at 90° C. for 15 minutes. The fibers gain 1% in weight, based on the weight of the fibers. Treated and untreated fibers are separately processed through a wool blender to randomize the fibers and twenty ounces of each are placed in ticks measuring 20 x 26 inches. After determining the initial heights, the pillows are subjected to the laboratory bulk durability test for one hour. The pillows are then hand-fluffed and the final heights determined. The treated fibers have a height loss of 12% while the untreated fibers have a height loss of 19%.

EXAMPLE VI

Polyethylene terephthalate fibers of the kind described in Example I are treated with a 3% aqueous emulsion of the polysiloxane described in Example I. No catalyst is used and the treated fibers are dried at room temperature. The fibers gain 1% in weight, based on the weight of the fibers. The fibers carrying the "uncured" polysiloxane are then passed through the Kirschner beater section of a cotton picker to randomize the fibers. Twenty ounces of the randomized fibers are placed in a tick measuring 20 x 26 inches and the initial height measured. The pillow is then subjected to the laboratory bulk durability test for one hour, the pillow hand-fluffed, and the final height determined. The pillow is found to have a height loss of 11%. This example shows that it is not necessary to cure the polysiloxane containing Si—H bonds. However, since this result compared with the results of Samples H to L of Example III and is superior to the uncured and untreated Samples (M and N) of that example, it is believed that "aging" of the Si—H bonds occurs.

EXAMPLE VII

Polyethylene terephthalate fibers of the kind described in Example I are dipped into a 1% emulsion of a polysiloxane mixture consisting of 20 parts of methylhydrogen polysiloxane, 30 parts of dimethylpolysiloxane and 50 parts of a polysiloxane/polyethylene oxide block copolymer, the mixture has a viscosity of approximately 170 centipoises at 25° C. and about 20% of the silicon atoms are bonded to hydrogen. The block copolymer consists of 28% by weight of dimethylpolysiloxane and 72% by weight of polyethylene oxide and has a viscosity, as measured at 25° C. of 350 centistokes. The block copolymer contatins no Si—O—C bonds. The emulsion also contains 0.05% by weight of tin diacetate, zinc octanoate catalyst. The fibers are centrifuged and tumble-dried at 90° C. for 15 minutes and found to have gained 0.3% in weight, based on the weight of the fibers. The fibers are randomized as described in Example II and 20 ounces of the fibers placed in a tick measuring 20 x 26 inches. The initial height is measured and the pillow subjected to the laboratory durability test for one hour. The pillow is hand-fluffed, the worked height measured, and the bulk loss calculated. The pillow is found to lose only 9% of its bulk.

EXAMPLE VIII

Polyethylene terephthalate fibers of the kind described in Example I are divided into two portions and treated with emulsions of the polysiloxane described in Example I. One portion is treated with an emulsion containing 0.12% of the polysiloxane and 0.014% of the catalyst to give Sample O. The second portion is treated with an emulsion containing 6.05% of the polysiloxane and 0.76% catalyst to give Sample P. After centrifugaing and heating at 90° C. for 15 minutes, Samples O and P are found to have gained, respectively, about 0.1% and about 6.0% in weight, based on the weight of the fibers. The two samples are randomized separately as described in Example II and 20 ounces of each placed in ticks measuring 20 x 26 inches. After the initial height has been determined, the pillows are subjected to the laboratory durability test for two hours. The two pillows are refluffed as described in Example I, the worked heights determined, and the bulk loss calculated. Sample O has a bulk loss of 30% and Sample P, a bulk loss of 25%. Thus, it is seen that too little or excessive amoutns of the polysiloxane do not produce the desirable results of this invention.

In the contemplation of this invention, the term "polyesters" is meant to include crystallizable, linear, condensation polymers containing in the polymer chain carbonyloxy-linking radicals,

The polymers should be of fiber-forming molecular weight. Polymers containing ovycarbonyloxy radicals are considered to be within the term "polyesters." Similarly, copolyesters, terpolyesters and the like, are also intended to be within the scope of the term "polyesters." Examples of such crystallizable, linear, condensation polymers include polyethylene terephthalate, polyethylene terephthalate/isophthalate (85/15), polyethylene terephthalate/hexahydroterephthalate (90/10), polyethylene terephthalate/-5-(sodium sulfo) isophthalate (97/3), poly(p-hexahydroxylene terephthalate), poly(diphenylolpropane isophthalate), poly(diphenylolpropane carbonate), polyethylene naphthalene dicarboxylates (especially those derived from the 2,6- and 2,7-isomers), and poly(m-phenylene isophthalate), and the like.

As was previously mentioned, the random arrangement of fibers for the practice of this invention can be prepared in any suitable manner. For example, a suitable arrangement can be prepared by feeding the web from a card to the inlet of a vacuum system. The air entering the vacuum system funnels the web to the mouth of the system where the web is broken into tufts which are tumbled as they pass through the hose to the collecting station. The product collected will be a random arrangement of tufts which have coalesced to a cohesive, semi-particulate mass. Although the individual fibers of the 0.5-inch to 4-inch diameter tufts will retain a degree of the alignment present in the original web, each tuft will bear no fixed relationship to any other tuft; thus, the over-all effect will be one of random arrangement. Another example of a suitable method is to utilize well-known equipment in an unorthodox manner. In a conventional manner, the synthetic fibers can be carded to open and separate the fibers and to form a web. This web will then be fed into a picker which tears off bits of the web and recombines the fibers in a random manner, the resulting structure being homogeneous and characterized by random arrangement of the fibers in all directions.

This invention provides filling materials with superior bulk retention in comparison with filling structures heretofore prepared. In addition, the filling materials of this invention are readily fluffed and washable.

The polysiloxanes, which are used as the coating on the filling materials of this invention, as well-known textile-treating agents and have been extensively used as water-proofing and softening agents for fabrics. Also, the polysiloxanes are well-known as lubricants and, in some manner, are believed to function as such in the present invention. According to the proposed theory, bulk loss is due to matting, i.e., under repeated stressing the individual fibers migrate and assume a parallel position with respect to one or more neighboring fibers. In view of this, it is indeed totally unexpected that the use of a lubricant would result in improved bulk stability.

Also, as was shown in Example VII, the coating mixture may contain more than one polysiloxane compound having no Si—H bonds as long as at least 2% of the total silicon atoms in the mixture are bonded to hydrogen.

Since many different embodiments of the invention may be made without departing from the spirit and scope thereof, it is to be understood that the invention is not limited by the specific illustrations except to the extent defined in the appended claims.

What is claimed is:

1. A filling material of improved bulk stability comprising polyester crimped fibers in random arrangment and having a crimp index of at least 6, at least 4 crimps per inch and fiber lengths from about 2 to about 4 inches, said polyester crimped fibers containing as a coating thereon, from about 0.30 to about 3.0% by weight, based on the weight of the fibers, a member selected from the group consisting of methylhydrogenpolysiloxane and dimethyl/methylhydrogen copolysiloxane.

2. The filling material of claim 1 wherein said coating is methylhydrogenpolysiloxane.

3. The filling material of claim 1 wherein said coating is dimethyl/methylhydrogen copolysiloxane.

4. A filling material of improved bulk stability comprising polyester crimped fibers in random arrangement and having a crimp index of at least 6, at least 4 crimps per inch and fiber lengths from about 2 to about 4 inches, said polyester crimped fibers containing as a coating thereon, from about 0.30 to about 3.0% by weight, based on the weight of the fibers, a mixture containing an organopolysiloxane having a viscosity, at 25° C., between 1,000 and 100,000 centistokes and containing between 2.0 and 2.1 radicals per silicon atom, said radicals consisting of hydrocarbon radicals free from aliphatic unsaturation and having from 1 to 6 carbon atoms, and a member selected from the group consisting of methylhydrogenpolysiloxane and dimethyl/methylhydrogen copolysiloxane, with the proviso that at least 2% of the total silicon atoms in said mixture are bonded to hydrogen.

5. The filling material of claim 4 wherein said coating consists of a mixture containing an organopolysiloxane having a viscosity, at 25° C., between 1,000 and 100,000 centistokes and containing between 2.0 and 2.1 radicals per silicon atom, said radicals consisting of hydrocarbon radicals free from aliphatic unsaturation and having from 1 to 6 carbon atoms, and methylhydrogenpolysiloxane.

6. The filling material of claim 4 wherein said coating consists of a mixture containing an organopolysiloxane having a viscosity, at 25° C., between 1,000 and 100,000 centistokes and containing between 2.0 and 2.1 radicals per silicon atom, said radicals consisting of hydrocarbon radicals free from aliphatic unsaturation and having from 1 to 6 carbon atoms, and dimethyl/methylhydrogen copolysiloxane.

7. A filling material of improved bulk stability comprising polyester crimped fibers in random arrangement and having a crimp index of at least 6, at least 4 crimps per inch and fiber lengths from about 2 to about 4 inches, said polyester crimped fibers containing as a coating thereon, from about 0.30 to about 3.0%, by weight, based on the weight of the fibers, a mixture containing a block copolymer of dimethylpolysiloxane and polyethylene oxide, said block copolymer containing between 15 and 85%, by weight, of dimethylpolysiloxane and having a viscosity, at 25° C., between 10 and 3,000 centistokes, and an organopolysiloxane selected from the group consisting of methylhydrogenpolysiloxane and dimethyl/methylhydrogen copolysiloxane, with the proviso that at least 2% of the total silicon atoms in said mixture are bonded to hydrogen.

8. The improved filling material of claim 7 wherein said organopolysiloxane is methylhydrogenpolysiloxane.

9. The improved filling material of claim 7 wherein said organopolysiloxane is dimethyl/methylhydrogen copolysiloxane.

References Cited

UNITED STATES PATENTS

| | | | |
|---|---|---|---|
| 2,588,365 | 3/1952 | Dennett | 117—161 |
| 2,588,393 | 3/1952 | Kauppi | 260—46.5 |
| 3,146,799 | 9/1964 | Fekete | 117—161 |
| 3,189,662 | 6/1965 | Vaughn | 260—824 |
| 3,251,794 | 5/1966 | Paliyenko et al. | 117—138.8 |
| 3,271,189 | 9/1966 | Hofmann | 117—161 |

FOREIGN PATENTS 880,315  10/1961  Great Britain.

WILLIAM D. MARTIN, *Primary Examiner.*

M. R. LUSIGNAN, *Assistant Examiner.*

U.S. Cl. X.R.

117—140, 161